United States Patent
Kurumatani (10) Patent No.: US 6,480,606 B1
(45) Date of Patent: Nov. 12, 2002

(54) ELLIPTIC CURVE ENCRYPTION METHOD AND SYSTEM

(75) Inventor: Hiroyuki Kurumatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/255,858

(22) Filed: Feb. 23, 1999

(30) Foreign Application Priority Data

Feb. 26, 1998 (JP) .......................................... 10-044851

(51) Int. Cl.$^7$ ................................................ H04L 9/00
(52) U.S. Cl. ...................................................... 380/30
(58) Field of Search ..................... 380/30, 28; 708/491, 708/492, 490, 620, 625

(56) References Cited

U.S. PATENT DOCUMENTS 6,088,453 A * 7/2000 Shimbo ........................ 380/28
6,285,760 B1 * 9/2001 Crandall ....................... 380/30
6,307,935 B1 * 10/2001 Crandall et al. ............... 380/28

OTHER PUBLICATIONS

A Menezes et al., "Handbook of Applied Cryptography" CRC Press p. 139, p. 600, p. 616, 1996.
Henri Cohen, "A Course in Computational Algebraic Number Theory", GTM 138, Springer, 1993, p. 464 Atkin's Test.

* cited by examiner

Primary Examiner—Matthew Smithers
(74) Attorney, Agent, or Firm—Antonelli, Terry, Stout & Kraus, LLP (57) ABSTRACT

In encryption techniques using an elliptic curve, in order to use a homogeneous coordinate system [X, Y, Z], a high speed $[X_1, Y_1, Z_1, (Z_1)^2, (Z_1)^3]$ for the addition and a high speed $[X_1, Y_1, Z_1]$ for the doubling the following schemes are provided: (1) Addition is executed by $[X_3, Y_3, Z_3]=[X_1, Y_1, Z_1, (Z_1)^2, (Z_1)^3]+[X_2, Y_2, Z_2]$. (2) Doubling is executed by a conventional $[X_3, Y_3, Z_3]=2[X_1, Y_1, Z_1]$ and an addition operation is executed by $[X_3, Y_3, Z_3]=[X_1, Y_1, Z_1, (Z_1)^2, (Z_1)^3]+[X_2, Y_2, Z_2]$. It is also required to speed up the multiplication modulo operation. The Montgomery multiplication modulo operation is speeded up by using the following forms of the definition order (prime): (3) the multiplication modulo operation is executed at high speed by using a prime having a form of $p=Ab^n+B$ where $0<A<2^w$, $0<B<2_w$, $b=2_w$; and w, A, b, n and B are positive integers.

15 Claims, 4 Drawing Sheets

| XXXXXXXX | 00000000 | 00000000 | 00000000 | XXXXXXXX |
|---|---|---|---|---|
| 501 | 502 | 503 | 504 | 505 |

FIG.6

| XXXXXXXX | 00000000 | 00000000 | 00000000 | 00000001 |
|---|---|---|---|---|
| 601 | 602 | 603 | 604 | 605 |

ELLIPTIC CURVE ENCRYPTION METHOD AND SYSTEM

BACKGROUND OF THE INVENTION

1. Field of the Invention

The present invention relates to techniques of retaining security of a computer network, and more particularly to encryption techniques using an elliptic curve.

2. Description of the Related Art

Elliptic curve encryption is public key cryptography independently invented by V. Miller and N. Koblitz.

The public key cryptosystem has been developed in order to eliminate disadvantages of a common key cryptosystem, the disadvantages being the security which may possibly be lowered at the stage when a private key which is kept secret from third parties is shared by two partners exchanging enciphered information. In this public key cryptosystem, a pair of a private and a public key is used. The private key secret from third parties belongs to a particular individual, and the public key is obtained through arithmetic operation of the private key and made public to third parties.

One feature of this public key cryptosystem resides in that a text enciphered by the public key of a particular person cannot be deciphered unless the private key (paired with the public key) of the person is used. This feature can be utilized when a text is transmitted to a partner while the text is kept secret from third parties. For example, when Mr. A transmits a text to Mr. B, the text enciphered by using the public key of Mr. B is transmitted. The enciphered text can be deciphered only with the private key of Mr. B paired with the public key so that only Mr. B can recover the original plain text.

A text enciphered with the private key of a particular person can be verified, by using the public key paired with the private key of the person, as to whether or not the text was enciphered by the secret key. This feature can be applied to digital signature. The digital signature is data obtained through arithmetic operation of a text to be signed and through encipher with the private key of the signer. For example, verification of the digital signature of Mr. A can be made depending upon whether or not the data obtained through decipher of the digital signature with the public key of Mr. A is coincident with the data obtained through arithmetic operation of a text to be signed and through encipher with the private key of the signer. If coincident, it can be verified that the digital signature is a correct signature made by Mr. A and that the text with the digital signature was not illegally altered. This feature can therefore be applied to identification of a particular person and prevention of illegal alteration on a network such as the Internet. Verification of a correct signature can be applied to prevent a hostile pretender from purchasing some goods. Verification of no alteration of a text can be applied to prevent alteration of a price entered in a contract note or a receipt.

From the viewpoint of security, requirements for the public key cryptosystem are that it is practically impossible to find a private key from a paired public key made public to third parties. Other requirements for the public key cryptosystem which fundamentally takes a longer encipher and decipher time than a private key cryptosystem are a shorter encipher and decipher time. As the techniques of the public key cryptosystem satisfying these to contradictory requirements of security and speed, an elliptic curve encryption has been paid much attention, which is better than conventional RSA and ElGamal cryptosystems.

An elliptic curve is represented by a standard formula $y^2=x^3+ax+b$ ($4a+27b \neq 0$) of an elliptic curve in a finite field having a characteristic of 5 or higher. If a point of infinity is added to this curve, the Abelian group is established. The Abelian operation is represented by a symbol "+".

A typical elliptic curve used for encryption is represented by the following standard forms of Weierstrass.

0: Unit element (a point of infinity on a two-dimensional projective plane of an elliptic curve).

1) $0+0=0$

2) $(x, y)+0=(x, y)$

3) $(x, y)+(x, -y)=0$

4) Commutativity $(x_1, y_1)+(x_2, y_2)=(x_2, y_2)+(x_1, y_1)$

5) Addition $(x_3, y_3)=(x_1, y_1)+(x_2, y_2)$ $x_3=\lambda^2-x_1-x_2$; $y_3=\lambda(x_1-x_3)-y_1$; $\lambda=(y_2-y_1)/(x_2-x_1)$ 6) Doubling $(x_3, y_3)=(x_1, y_1)+(x_1, y_1)=2(x_1, y_1)$ $x_3=\lambda^2-2*x_1$; $y_3=\lambda(x_1-y_3)-y_1$; $\lambda=(3*x_1^2=a)/(2*y_1)$ An elliptic curve cryptograph uses an elliptic curve in a finite field and a set of points constituting the finite filed.

As the finite field, a set Fp of remainders of integers congruent modulo of a prime p is used.

$F_p=\{0, 1, \ldots, p-1\}$

The order of a finite field is the number of elements of the finite field. The order of an elliptic curve is the number of points on an elliptic curve.

A result of s-time addition of P (p+ . . . +P) is called an s-multiple point of P, and an operation of obtaining the s-multiple point of P is represented by sP.

The order of a point P on an elliptic curve is n which satisfies nP=0, 1<=m<n, and mp≠0.

Keys of the elliptic curve cryptograph include the following elliptic curve, base point, public key, and private key.

Coefficients of an elliptic curve are a and b.

Base point: a point P having a prime as the order.

Private key: finite field element d.

Public key: a point of private-key-multiplication of the base point Q (Q=dP).

An elliptic curve, base point, and public key are public information. The public key and private key are different for each user, whereas the elliptic curve and base point are common to each user.

Data encipher, data decipher, digital signature generation, and digital signature verification respectively of the elliptic curve encryption uses a sR operation of an arbitrary point R. This operation can be executed by a combination of the above-described addition and doubling. The above-described addition arithmetic and doubling each require to perform a division once. However, it takes a very long time to perform a division in a finite field. A method of avoiding a division in the finite field has been desired.

According to the document of D. V. Chudnovsky, G. V. Chudnovsky "Sequences of Numbers Generated by Addition in Formal Groups and New and New Primality and Factorization Tests", Advances in Applied Mathematics, 7, 385–434, 1986, formulas of the addition and doubling are derived in a projective space. These formulas will be described in the following.

Chudnovsky Formulas 1

Addition:

$[X_3, Y_3, Z_3]=[X_1, Y_1, Z_1]+[X_2, Y_2, Z_2]$ $X_3=-(U_1+U_2)P^2+R^2$ $2Y_3=R(-2R^2+3P^2(U_1+U_2))-P^3(S_1+S_2)$ $Z_3=Z_1Z_2P$ $U_1=X_1(Z_2)^2$; $U_2=X_2(Z_1)^2$; $S_1=Y_1(Z_2)^3$ $S_2=Y_2(Z_1)^3$ $P=U_2-U_1$; $R=S_2-S_1$

Doubling:

$[X_3, Y_3, Z_3]=2[X_1, Y_1, Z_1]$ $X=T$ $Y=-8((Y_1)^2)^2+M(S-T)$ $Z=2Y_1Z_1$ $S=4X_1(Y_1)^2$; $M=3(X_1)^2+a((Z_1)^2)^2$; $T=-2S+M^2$ $M=3(X_1-(Z_1)^2(X_1+(Z_1)^2$ if $a=-3$ $M=3(X_1)^2$ if $a=0$

The $X_1$, $Y_1$, and $Z_1$ are finite field elements whose data can be expressed by a multiple-precision integer (larger than $2^{160}$)

Multiple-precision multiplication modulo arithmetic generally takes a longer time than multiple-precision addition subtraction. Therefore, a calculation time can be evaluated from the multiplication modulo arithmetic. The above-cited document describes that the addition arithmetic requires to perform a multiplication modulo operation 16 times and the doubling requires to perform it 10 times. It also describes that if the coefficient a of an elliptic curve is $a=-3$, it is required to perform the multiplication modulo operation 8 times, and if $a=0$, it is required to perform it 8 times.

The document further describes a method using an expression of $[X_1, Y_1, Z_1, (Z_1)^2, (Z_1)^3]$ which is described in the following.

Chudnovsky Formulas 2

Addition arithmetic:

$[X_1, Y_1, Z_1, (Z_1)^2, (Z_1)^3]=[X_1, Y_1, Z_1, (Z_1)^2, (Z_1)^3]+[X_2, Y_2, Z_2, (Z_2)^2, (Z_2)^3]$

Doubling:

$[X_3, Y_3, Z_3, (Z_3)^2, (Z_3)^3]=2[X_1, Y_1, Z_1, (Z_1)^2, (Z_1)^3]$

The document describes that the addition arithmetic requires to perform the multiplication modulo operation 14 times and the doubling requires to perform it 11 times.

The addition arithmetic can be performed at high speed by <Chudnovsky Formulas 2>, whereas the doubling can be performed at high speed by <Chudnovsky Formulas 1>.

As an example of the multiple-precision multiplication modulo arithmetic, Montgomery modulo arithmetic is known which is described in the document of A. Menezes, P. Oorschot, S. Vanstone, "Handbook of Applied Cryptography", CRC Press, p. 600 (1996), Section 14.3 Multiple-precision modular arithmetic.

The Montgomery modulo arithmetic described in this document will be described.

Input:

$p=(p_{n-1}, \ldots, p_2, p_1)$; $\gcd(p, b)=1$; $R=b^n$;

$p'=-1/p \bmod b$; $T=(t_{2n-1}, \ldots, t_1, t_0)<pR$;

$b=2^w$ p is a modulo by which an integer is divided to obtain a remainder. $0<=p_i<b$. $0<=t_i<b$. w is a positive integer. T is a multiplication result of integers x and y which is smaller than p.

An output is assumed to be T/R (mod p).

Step 1: $A \leftarrow T$

Step 2: The following Steps 2.1 and 2.2 are executed from $i=0$ to $i=(n-1)$.

Step 2.1: $u_i \leftarrow a_i p' \bmod b$

Step 2.2: $A \leftarrow A+u_i pb^i$

Step 3: $A \leftarrow A/b^n$

Step 4: If $A>=p$, then $A \leftarrow A-p$

Step 5: A is an output.

An elliptic curve used for the elliptic curve encryption is expressed by an elliptic curve $y^2=x^2+ax+b$ which uses as the definition field a prime field Fp having a prime p as its order. In order to form a perfect elliptic curve, it is necessary to set the parameters a and b which have prime factors r having a large order #E(Fp) of an elliptic curve, where

E(Fp)=kr, k is a small integer, and r is a large prime.

A method of setting parameters of an elliptic curve having primes with a large order is described in the document of Henri Cohen, "A Course in Computational Algebraic Number Theory", GTM138, Springer (1993), p.464, Atkin's Test.

As a primality test used when the prime p is generated, a Miller-Rabin primality test is widely used which is described in the document of A. Menezes, P. Oorschot, S. Vanstone, "Handbook of Applied Cryptography", CRC Press, p. 139 (1996), Section 4.1.3.

Elliptic curve cryptograph using specific primes are described in U.S. Pat. No. 5,271,061 and U.S. Pat. No. 5,463,690. These patents disclose techniques of using the prime p in the form of "$p=2^e-a$; e is a positive integer; and a<232 or a=1" in the elliptic curve encryption having as its definition field a finite field Fq with $q=p^k$, i.e., a finite field of characteristic p. An operation of obtaining an s-multiple point of a point P is similar to an exponentiation modulo operation of an integer of a raised to a power of e. As a high speed exponent operation, a sliding-window method is known which is described in the document of A. Menezes, P. Oorschot, S. Vanstone, "Handbook of Applied Cryptography", CRC Press, p. 616 (1996), Section 14.6.1 (ii), "Sliding-window exponentiation".

Both <Chudnovsky Formulas 1> and <Chudnovsky Formulas 2> are not satisfactory for high speed operations. The inventors consider that an operation method is desired which provides an efficiency of <Chudnovsky Formulas 2> for the addition and an efficiency of <Chudnovsky Formulas 1> for the doubling.

In order to further speed up a calculation time, it is necessary to speed up the multiplication modulo operation used in <Chudnovsky Formulas 1> and <Chudnovsky Formulas 2>.

SUMMARY OF THE INVENTION

In order to solve the above-described problems, the following means are provided in order to use a high speed $[X_1, Y_1, Z_1, (Z_1)^2, (Z_1)^3]$ for the addition and a high speed $[X_1, Y_1, Z_1]$ for the doubling.

(1) Addition: execute $[X_3, Y_3, Z_3]=[X_1, Y_1, Z_1, (Z_1)^2, (Z_1)^3]+[X_2, Y_2, Z_2]$.

(2) A doubling point calculation is executed by a conventional $[X_3, Y_3, Z_3]=2[X_1, Y_1, Z_1]$ and an addition operation is executed by $[X_3, Y_3, Z_3]=[X_1, Y_1, Z_1, (Z_1)^2, (Z_1)^3]+[X_2, Y_2, Z_2]$.

It is also required to speed up the multiplication modulo operation. The Montgomery multiplication modulo operation is speeded up by using the following forms of the definition order (prime).

(3) The multiplication modulo operation is executed at high speed by using a prime having a form of $p=Ab^n+B$ ($0<A<2^w$; $0<B<2^w$; $b=2^w$; and w, A, b, n and B are positive integers).

DETAILED DESCRIPTION OF THE EMBODIMENTS

Figure 1:
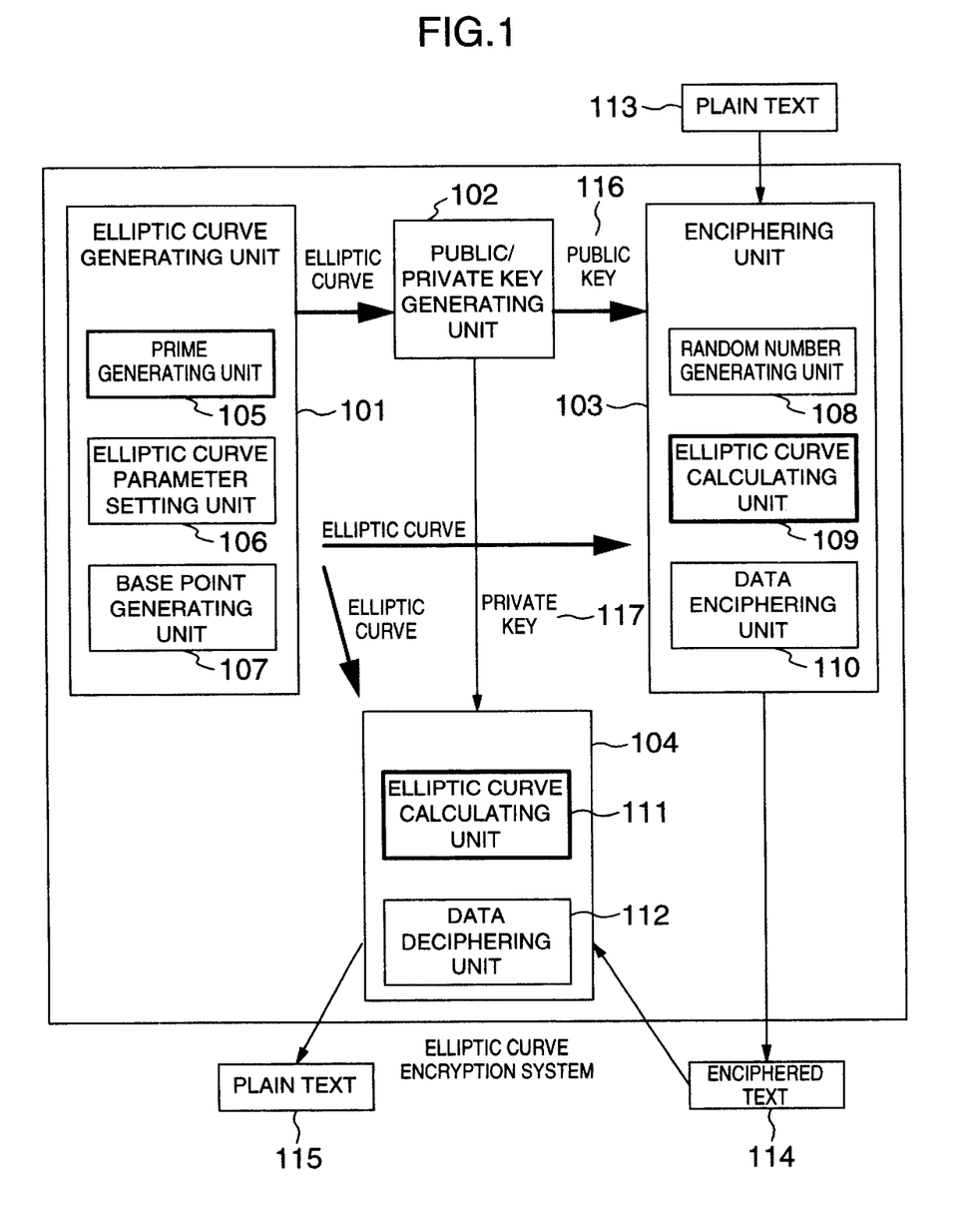
FIG. 1 is a block diagram illustrating an elliptic curve encryption method according to a first embodiment of the invention.

FIG. 1 illustrates a first embodiment. An elliptic curve encryption system of this invention illustrated in FIG. 1 executes enciphering and deciphering operations.

An elliptic curve generating unit 101 generates an elliptic curve to be used for elliptic curve encryption. A public/private key generating unit 102 generates a public key 116 and a private key 117 in accordance with an input elliptic curve generated by the elliptic curve generating unit 101. The public key 116 is distributed over a network (not shown) or the like similar to a conventional public key cryptosystem.

An enciphering unit 103 receives a plain text 113 and a public key 116 and outputs an enciphered text 114. The enciphering unit 103 may be formed on an electronic apparatus other than a computer if the electronic apparatus has an arithmetic unit capable of operating the enciphering unit 103 in accordance with the elliptic curve encryption of this invention.

A deciphering unit 104 receives the enciphered text 114 and private key 117 and outputs a plain text 115 which is the same as the original plain text 103. Similar to the enciphering unit 103, the deciphering unit 104 may be formed on an electronic apparatus other than a computer if the electronic apparatus has an arithmetic unit capable of operating the deciphering unit 104 in accordance with the elliptic curve encryption of this invention.

The prime p is generated by a prime generating unit 105 of the elliptic curve generating unit 101 by the following sequence.

1: A random number p is generated to follow the next step.
2: The prime of p is judged by the Miller-Rabin primality test. If the random number is judged as the prime, the sequence is terminated, whereas if it is judged as a composite number, the sequence returns to step 1.

The invention may be practiced by using another primality test.

An elliptic curve parameter setting unit 106 sets the parameters a and b of an elliptic curve $y^2=x^3+ax+b$ which uses as the definition field a prime field Fp having the prime p generated by the prime generating unit 105 as its order. In order to form a perfect elliptic curve, it is necessary to set the parameters a and b which have prime factors r having a large order #E(Fp) of the elliptic curve, where

E(Fp)=kr, k is a small integer, and r is a large prime.

By using the method described in the document of Henri Cohen, "A Course in Computational Algebraic Number Theory", GTM138, Springer (1993), p.464, Atkin's Test, an elliptic curve is generated which has large prime factors r as the order. The invention may be practiced by using another elliptic curve parameter setting method capable of setting an elliptic curve having large prime factors r as the order of the elliptic curve.

A base point generating unit 107 obtains a generator of a cyclic group having the prime factor r as the order in an Abelian group on the elliptic curve. If #E(Fp)=kr, the following sequence is executed.

1: An arbitrary point $(x_1, y_1)$ on E(Fp) is obtained.
2: If $r(x_1, y_1)=0$ and $k(x_1, y_1) \neq 0$, the base point is $G=(x_1, y_1)$. If not, the sequence returns to step 1.

An operation $r(x_1, y_1)$ is a scalar multiplication (r-multiplication) operation of $(x_1, y_1)$, which will be later described with an elliptic curve calculating unit 109.

As described above, in the elliptic curve generating unit 101, the definition field order p, the parameters a and b of the elliptic curve $y^2=x^3+ax+b$, base point G, and base point order r are generated which are information to be made public.

The public/private key generating unit 102 generates the public key and private key by the following sequence.
Input:
Definition field order p, parameters a and b of the elliptic curve $y^2=x^3+ax+b$, and base point G
Output:
Public key Q and private key d
1: A random number $2<d<p-1$ is generated.
2: Q=dG, a d-multiple of G is obtained, which will be later described with the elliptic curve calculating unit 109.

The public key is information to be made public, and the private key is information to be kept in secret. A problem of obtaining d from Q and G is called a discrete logarithm problem. A calculation amount of calculating d from the elliptic curve is in the order of an exponent of a bit length of the order r of the base point. Therefore, if r is a large prime, e.g, $r>2^{159}$, it is practically impossible to obtain d from Q and G. This is a principle of an elliptic curve encryption.

The enciphering unit 103 converts the plain text 113 into the enciphered text by the following sequence.
Input:
Plain text M, public key Q, definition field order p, parameters a and b of the elliptic curve $y^2=x^3+ax+b$, and base point G
Output:
Enciphered Text C
Step 1: A random number k is generated (random number generating unit 108).
Step 2: $(x_1, y_1)=kG$ (elliptic curve calculating unit 109).
Step 3: $(x_2, y_2)=kQ$ (elliptic curve calculating unit 109).
Step 4: M'=M XOR $x_2$ (data enciphering unit 110).
Step 5: Enciphered text $C=x_1||y_1||M'\ Y_1$ (data enciphering unit 110).

The elliptic curve calculating unit 109 executes a scalar multiplication operation kR of an arbitrary point R.

In this operation, an addition operation is executed by $[X_3, Y_3, Z_3]=[X_1, Y_1, Z_1, (Z_1)^2, (Z_1)^3]+[X_2, Y_2, Z_2]$ and a doubling point calculation is executed by a conventional $[X_3, Y_3, Z_3]=2[X_1, Y_1, Z_1]$. This method will be described with reference to the flow chart of FIG. 2. Steps 2 and 3 are executed as illustrated in the flow chart of FIG. 2.

Figure 2:
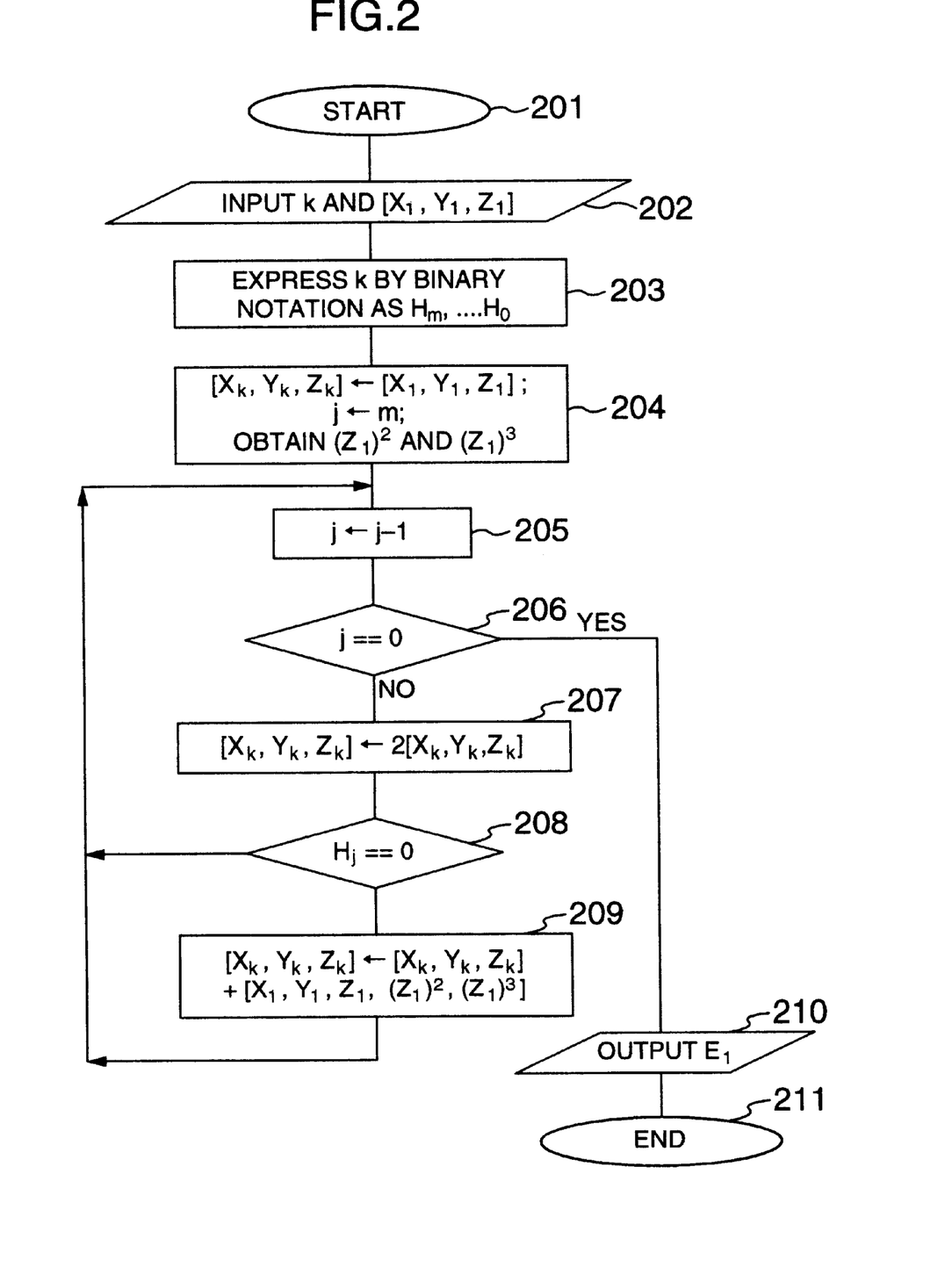
FIG. 2 is a flow chart illustrating an elliptic curve operation of the elliptic curve encryption method of the first embodiment.

Input:

k, R=$[X_1, Y_1, Z_1]$

Output:

kR

At Step 201, the operation starts.

At Step 202, k and R=$[X_1, Y_1, Z_1]$ are input.

At Step 203, k is expressed by binary notation as $H_m, \ldots, H_0$.

At Step 204, it is set that $[X_k, Y_k, Z_k] \leftarrow [X_1, Y_1, Z_1]$ and j←m, and $(Z_1)^2$ and $(Z_1)^3$ are calculated.

At Step 205, it is set that j←j−1.

At Step 206, it is checked whether j=0, in order to repeat Steps 206 to 208 from m to 1 of the variable j in the descending order. If j=0, the flow skips to Step 210, whereas if not the flow advances to Step 207.

At Step 207, it is set that $[X_k, Y_k, Z_k] \leftarrow 2[X_k, Y_k, Z_k]$.

At Step 208, it is judged whether $H_j$=0. If 0, the flow advances to Step 209, whereas if 1, the flow returns to Step 205.

At Step 209, it is set that $[X_k, Y_k, Z_k] \leftarrow [X_k, Y_k, Z_k]+[X_1, Y_1, Z_1, (Z_1)^2, (Z_1)^3]$.

At Step 210, Ei is output.

At Step 211, the operation is terminated.

The deciphering unit 104 converts the enciphered text 114 into the original plain text 115 same as the plain text 113 by the following sequence.

Input:

Enciphered text C=$x_1||y_1||$M'$Y_1$, private key d, definition field order p, parameters a and b of the elliptic curve $y^2=x^3+ax+b$, and base point G Output:

Plain text M

Step 1: $(x_2, y_2)=k(x_1, y_1)$ (elliptic curve calculating unit 111).

Step 2: Plain text M=M' XOR $x_2$

Step 1 is executed as illustrated in the flow chart of FIG. 2.

Next, a second embodiment will be described. In the second embodiment, the prime generating unit 105 shown in FIG. 1 generates a specific prime to allow a high speed operation. By using a prime having the form of p=$Ab^n$+B ($0<A<2^w$; $0<B<2^w$; b=$2^w$; and w, b, n and B are positive integers), the multi-precision modulo operation can be performed at high speed. The first and second embodiments may be practiced independently or a combination thereof may be practiced at higher speed.

By using the definition field order (prime) having the form of p=$Ab^n$+B, the Montgomery multiplication modulo operation used by the multi-precision integer multiplication modulo operation can be performed at high speed. This method will be described with reference to the flow chart shown in FIG. 3.

Figure 3:
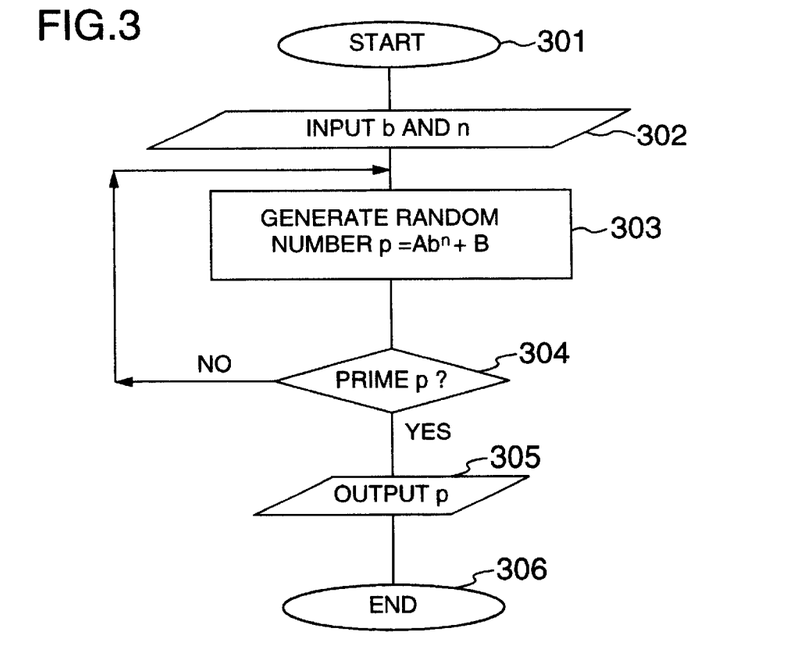
FIG. 3 is a flow chart illustrating a prime generation operation capable of performing an elliptic curve encryption method at high speed according to a second embodiment of the invention.

At Step 301, the operation starts.

At step 302, b and n are input.

At Step 303, a random number p=$Ab^n$+B is generated.

At Step 304, the prime of p is judged. In this example, the Miller-Rabin primality test is used. If it is judged that p is a prime, the flow advances to Step 305, whereas if it is judged that p is a composite number, the flow returns to Step 303.

At Step 305, p is output.

At Step 306, the operation is terminated.

Since the prime having the above-described form is used, in the Montgomery modulo operation described with the conventional techniques, a multiplication of p in Step 2.2: A←A+$u_i$p$b^i$ can be performed at high speed.

Figure 5:
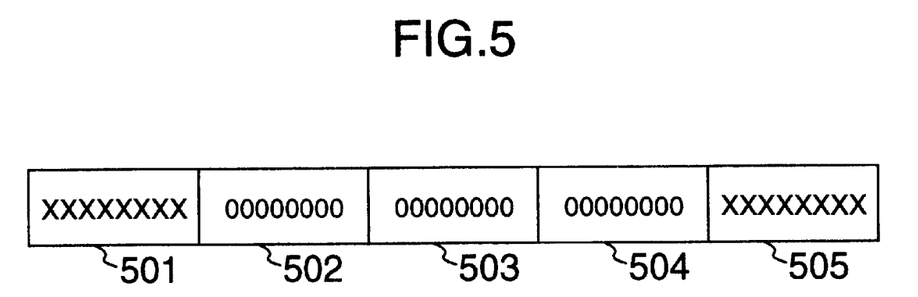
FIG. 5 is a diagram showing a bit train of primes used by the second embodiment.

In a conventional operation, a multiplication is performed for all $p_i$ and $u_i$. With the prime of this embodiment, a multiplication is performed only for the highest $p_n$=A and the lowest $p_0$=B. With the prime of this embodiment, $p_i$ excepting the highest and lowest is 0. For example, as shown in FIG. 5, if w=32, and n=5, the bits 502, 503, and 504 excepting the highest 32 bits 501 and lowest 32 bits 505 are 0 so that a multiplication work between 0 and $u_i$ can be omitted.

Figure 6:
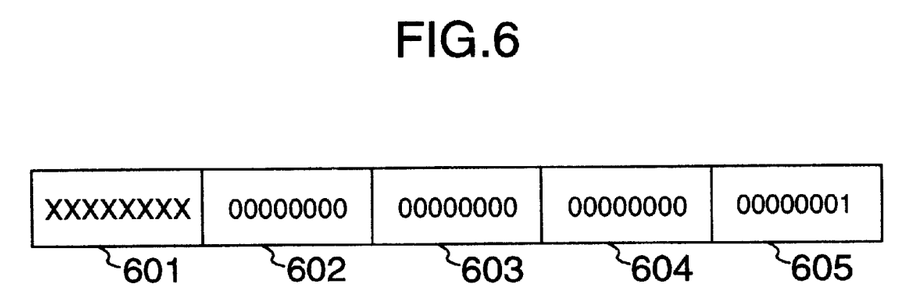
FIG. 6 is a diagram showing a bit train of primes used by the third embodiment.

Next, a third embodiment will be described. In the third embodiment, the prime generating unit 105 shown in FIG. 1 generates a prime having a form of p=$Ab^n$+1 to allow a high speed operation. This prime is a specific example of the prime described with FIG. 3. As compared to the prime described with FIG. 3, since a multiplication of the lowest $p_0$ is 1×$p_0$ and is not necessary, a multiplication is performed only for the highest $p_n$. For example, as shown in FIG. 6, if w=32 and n=5, a multiplication is performed only for the highest 32 bits 601. The bits 602, 603, and 604 are 0 so that a multiplication work between 0 and $u_i$ can be omitted. Since the lowest 605 is 1, the multiplication by $u_i$ can be omitted. This method will be described with reference to the flow chart shown in FIG. 4.

Figure 4:
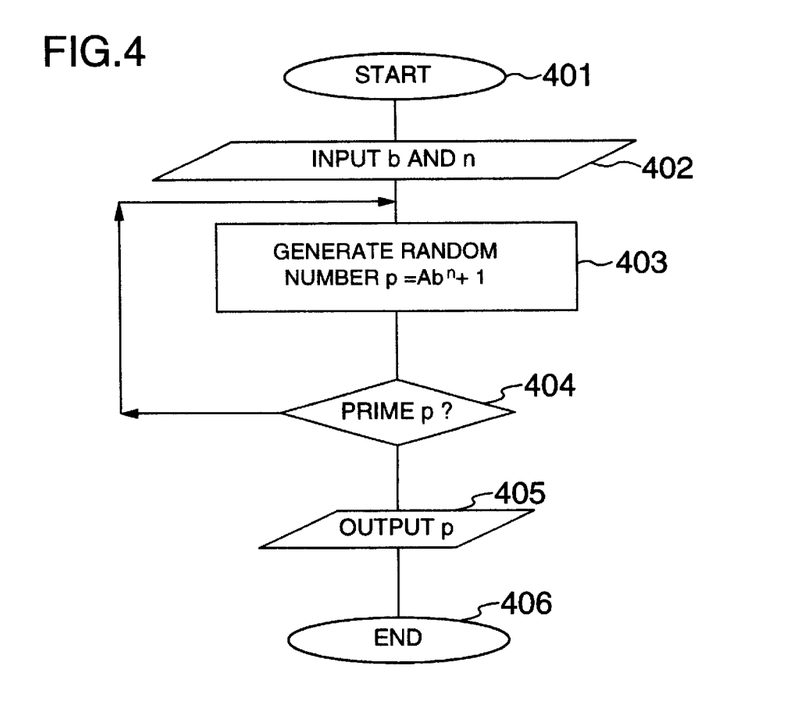
FIG. 4 is a flow chart illustrating a prime generation operation capable of performing an elliptic curve encryption method at high speed according to a third embodiment of the invention.

At Step 401, the operation starts.

At Step 402, b and n are input.

At Step 403, a random number p=$Ab^n$+1 is generated.

At Step 404, the prime of p is judged. In this example, the Miller-Rabin primality test is used. If it is judged that p is a prime, the flow advances to Step 405, whereas if it is judged that p is a composite number, the flow returns to Step 403.

At Step 405, p is output.

At Step 406, the operation is terminated.

Next, a fourth embodiment will be described. In the fourth embodiment, a higher speed operation is realized by the elliptic curve calculating unit 109 shown in FIG. 1. In the fourth embodiment, the sliding-window method is used for an s-multiple point operation of a point P, an addition operation is executed by $[X_3, Y_3, Z_3]=[X_1, Y_1, Z_1, (Z_1)^2, (Z_1)^3]+[X_2, Y_2, Z_2]$, and a doubling point calculation is executed by a conventional $[X_3, Y_3, Z_3]=2[X_1, Y_1, Z_1]$.

An algorithm described in the document of A. Menezes, P. Oorschot, S. Vanstone, "Handbook of Applied Cryptography", CRC Press, p. 616 (1996), Section 14.6.1 (ii) "Sliding-window exponentiation" will be described.

Sliding-window Exponentiation

Input:

g, e=$(e_t, e_{t-1}, \ldots, e_1, e_0)e_t$=1, k (integer)

Output:

$g^e$

Preliminary Calculations:

$g_1 \leftarrow 1$; $g_2 \leftarrow g^2$; $g_{2i+1} \leftarrow g_{2i-1}*g_2$ from 1 to $(2^{k-1}-1)$ of i Step 1: A←1; i←t Step 2: the following Steps are executed if i>=0

Step 21: if $e_t$=0, A←$A^2$ and i←i−1

Step 22: if not, the longest bit string $e_i, e_{i-1}, \ldots e_1$ where $i-1+1<=k$ and $e_1=1$ is searched, and it is set that $A \leftarrow A^{2}*g(e_i, e_{i-1}, \ldots, e_1)$ and $i \leftarrow 1-1$.

This algorithm is utilized for an algorithm of obtaining eP by using the addition operation of the invention. The algorithm of obtaining eP will be described.

Calculation of an e-multiple Point of a Point P using Sliding-window Method

Input:

$g, e=(e_i, e_{i-1}, \ldots, e_1, e_0)e_i=1, k$ (integer)

Output:

eP

Preliminary Calculations:

P1←P; P2←2P; $P_{2i+1} \leftarrow P_{2i-1}+P_2$ from 1 to $(2^{k-1}-1)$ of i

Step 1: $A \leftarrow P$; $i \leftarrow t$

Step 2: the following Steps are executed if i>=0

Step 21: if $e_i=0$, $A \leftarrow 2A$; $i \leftarrow i-1$

Step 22: if not, the longest bit string $e_i, e_{i-1}, \ldots e_1$ where $i-1+1<=k$ and $e_1=1$ is searched, and it is set that $A \leftarrow 2A+P(e_i, e_{i-1}, \ldots, e_1)$ and $i \leftarrow 1-1$.

In the preliminary calculations of this algorithm, each $P_{2i+1}$ is expressed by $[X_1, Y_1, Z_1, (Z_1)^2, (Z_1)^3]$. The calculation of $A \leftarrow 2A$ at Steps 21 and 22 is performed by $[X_3, Y_3, Z_3]=2[X_1, Y_1, Z_1]$. An addition calculation "+" in $2A+P(e_i, e_{i-1}, \ldots, e_1)$ at Step 22 is performed by $[X_3, Y_3, Z_3]=[X_2, Y_2, Z_2]+[X_1, Y_1, Z_1, (Z_1)^2, (Z_1)^3]$.

The above embodiments are practiced by software which executes the operations illustrated in FIGS. 3 to 5. Obviously, the embodiments can be practiced by using electronic circuits.

With each embodiment of the invention, data enciphering and deciphering processes using the elliptic curve encryption can be executed faster than conventional processes. Also with each embodiment of the invention, it is obvious that a person skilled in the art can execute a digital signature generation process and a digital signature verification process at high speed by using the elliptic curve encryption.

As described in each embodiment of the invention, by using a high speed $[X_1, Y_1, Z_1, (Z_1)^2, (Z_1)^3]$ for the addition arithmetic and a high speed $[X_1, Y_1, Z_1]$ for the doubling in the elliptic curve encryption, the following advantages can be obtained.

(1) Addition arithmetic: By using $[X_3, Y_3, Z_3]=[X_1, Y_1, Z_1, (Z_1)^2, (Z_1)^3]+[X_2, Y_2, Z_2]$, the addition calculation can be executed by performing a multi-precision integer multiplication modulo operation 14 times.

(2) In the scalar multiplication operation of an arbitrary point, a so-called window method is used to express a segment as $[X_1, Y_1, Z_1, (Z_1)^2, (Z_1)^3]$ so that the above-described 14 operations can be used for the addition calculation.

(3) The doubling calculation can be performed by the operations of 10 times (by 8 times if a=−3) by executing a conventional $[X_3, Y_3, Z_3]=2[X_1, Y_1, Z_1]$.

According to the present invention, data enciphering and deciphering processes using the elliptic curve encryption can be executed faster than conventional processes, and a digital signature generation process and a digital signature verification process can be executed at high speed.

What is claimed is:

1. An elliptic curve encryption method using an elliptic curve over a prime field, comprising the steps of:

expressing different points on the elliptic curve in a homogeneous coordinate system [x, y, z] using $[x_3, y_3, z_3]$ and $[x_1, y_1, z_1, (z_1)^2, (z_1)^3]$;

adding said points using $[x_3, y_3, z_3]=[x_1, y_1, z_1, (z_1)^2, (z_1)^3]+[x_2, y_2, z_2]$;

doubling said points using $[x_3, y_3, z_3]=2[x_1, y_1, z_1]$;

performing scalar multiplication using said point addition and said point doubling; and performing encryption or decryption using the performance result of said scalar multiplication.

2. An elliptic curve encryption method using an elliptic curve over a prime field, comprising the steps of:

defining a prime p as an order of a prime field, which has a form of $p=Ab^n+B$ where $0<A<2^w$, $0<B<2^w$, $b=2^w$, w, A, B, b are positive integers; and performing encryption or decryption using the defined prime p.

3. An elliptic curve encryption method using an elliptic curve over a prime field, comprising the steps of:

defining a prime p as an order of a prime field, which has a form of $p=Ab^n+B$ where $0<A<2^w$, $0<B<2^w$, $b=2^w$, w, A, B, b are positive integers;

performing a finite field arithmetic using said p;

performing scalar multiplication using said finite field arithmetic; and performing encryption or decryption using the performance result of said scalar multiplication.

4. An encryption system for executing an elliptic curve encryption method using an elliptic curve over a prime field, comprising:

means for expressing different points on the elliptic curve in a homogeneous coordinate system [X, Y, Z], which using $[X_3, Y_3, Z_3]$ and $[X_1, Y_1, Z_1, (Z_1)^2, (Z_1)^3]$;

means for adding said different points using $[X_3, Y_3, Z_3]=[X_1, Y_1, Z_1, (Z_1)^2, (Z_1)^3]+[X_2, Y_2, Z_2]$; and means for doubling said different points using $[X_3, Y_3, Z_3]=2[X_1, Y_1, Z_1]$.

5. An encryption system as claimed in claim 4, further comprising:

means for performing a scalar multiplication using the point addition and the point doubling; and means for performing encryption or decryption using a performance result of said scalar multiplication.

6. An encryption system for executing an elliptic curve encryption method using an elliptic curve over a prime field, wherein:

means for defining a prime p as an order of a prime field, which has a form of $p=Ab^n+B$ where $0<A<2^w$, $0<B<2^w$, $b=2^w$, and w, A, B and b are positive integers; and means for performing encryption or decryption using said prime p defined by said prime defining means.

7. An encryption system for executing an elliptic curve encryption method using an elliptic curve over a prime field, comprising:

means for defining a prime p as an order of a prime field, which has a form of $p=Ab^n+B$ where $0<A<2^w$, $0<B<2^w$, $b=2^w$, and w, A, B and b are positive integers;

means for performing a finite field arithmetic using said prime p;

means for performing a scalar multiplication using said finite field arithmetic; and means for performing encryption or decryption using the performance result of said scalar multiplication.

8. An elliptic curve encryption method of receiving elliptic curve information to generate a public key and enciphering a plain text in accordance with the elliptic curve information and the public key, comprising the steps of:

provisioning different points on the elliptic curve in a homogeneous coordinate system $[X, Y, Z]$ which are expressed by $[X_3, Y_3, Z_3]$ and $[X_1, Y_1, Z_1, (Z_1)^2, (Z_1)^3]$;

using $[X_3, Y_3, Z_3] = [X_1, Y_1, Z_1, (Z_1)^2, (Z_1)^3] + [X_2, Y_2, Z_2]$ in a point addition process; and using $[X_3, Y_3, Z_3] = 2[X_1, Y_1, Z_1]$ in a point doubling process.

9. An elliptic curve encryption method as claimed in claim 8, further comprising:

performing a scalar multiplication using results of the point addition process and the point doubling process; and performing encryption or decryption using a performance result of said scalar multiplication.

10. An elliptic curve encryption method of receiving elliptic curve information to generate a private key and deciphering an enciphered text in accordance with the elliptic curve information and the private key, comprising the steps of:

providing different points on the elliptic curve in a homogeneous coordinate system $[X, Y, Z]$ which are expressed by $[X_3, Y_3, Z_3]$ and $[X_1, Y_1, Z_1, (Z_1)^2, (Z_1)^3]$;

using $[X_3, Y_3, Z_3] = [X_1, Y_1, Z_1, (Z_1)^2, (Z_1)^3] + [X_2, Y_2, Z_2]$ in a point addition process; and using $[X_3, Y_3, Z_3] = 2[X_1, Y_1, Z_1]$ in a point doubling process.

11. An elliptic curve encryption method as claimed in claim 10, further comprising:

performing a scalar multiplication using results of the point addition process and the point doubling process; and performing encryption or decryption using a performance result of said scalar multiplication.

12. A computer-readable storage device for storing a program for implementing a method for an elliptic curve encryption method using an elliptic curve in a prime field, comprising the steps of:

providing different points on the elliptic curve in a homogeneous coordinate system $[X, Y, Z]$ which are expressed by $[X_3, Y_3, Z_3]$ and $[X_1, Y_1, Z_1, (Z_1)^2, (Z_1)^3]$;

using $[X_3, Y_3, Z_3] = [X_1, Y_1, Z_1, (Z_1)^2, (Z_1)^3] + [X_2, Y_2, Z_2]$ in a point addition process; and using $[X_3, Y_3, Z_3] = 2[X_1, Y_1, Z_1]$ in a point doubling process.

13. A computer-readable storage device as claimed in claim 12, further comprising:

performing a scalar multiplication using results of the point addition process and the point doubling process; and performing encryption or decryption using a performance result of said scalar multiplication.

14. A computer-readable storage device for storing a program for implementing an elliptic curve encryption method of receiving elliptic curve information to generate a private key and deciphering an enciphered text in accordance with the elliptic curve information and the private key, comprising the steps of:

providing different points on the elliptic curve in a homogeneous coordinate system $[X, Y, Z]$ which are expressed by $[X_3, Y_3, Z_3]$ and $[X_1, Y_1, Z_1, (Z_1)^2, (Z_1)^3]$;

using $[X_3, Y_3, Z_3] = [X_1, Y_1, Z_1, (Z_1)^2, (Z_1)^3] + [X_2, Y_2, Z_2]$ in a point addition process; and using $[X_3, Y_3, Z_3] = 2[X_1, Y_1, Z_1]$ in a point doubling process.

15. A computer-readable storage device as claimed in claim 14, further comprising:

performing a scalar multiplication using results of the point addition process and the point doubling process; and performing encryption or decryption using a performance result of said scalar multiplication.

* * * * *